UNITED STATES PATENT OFFICE 2,191,012

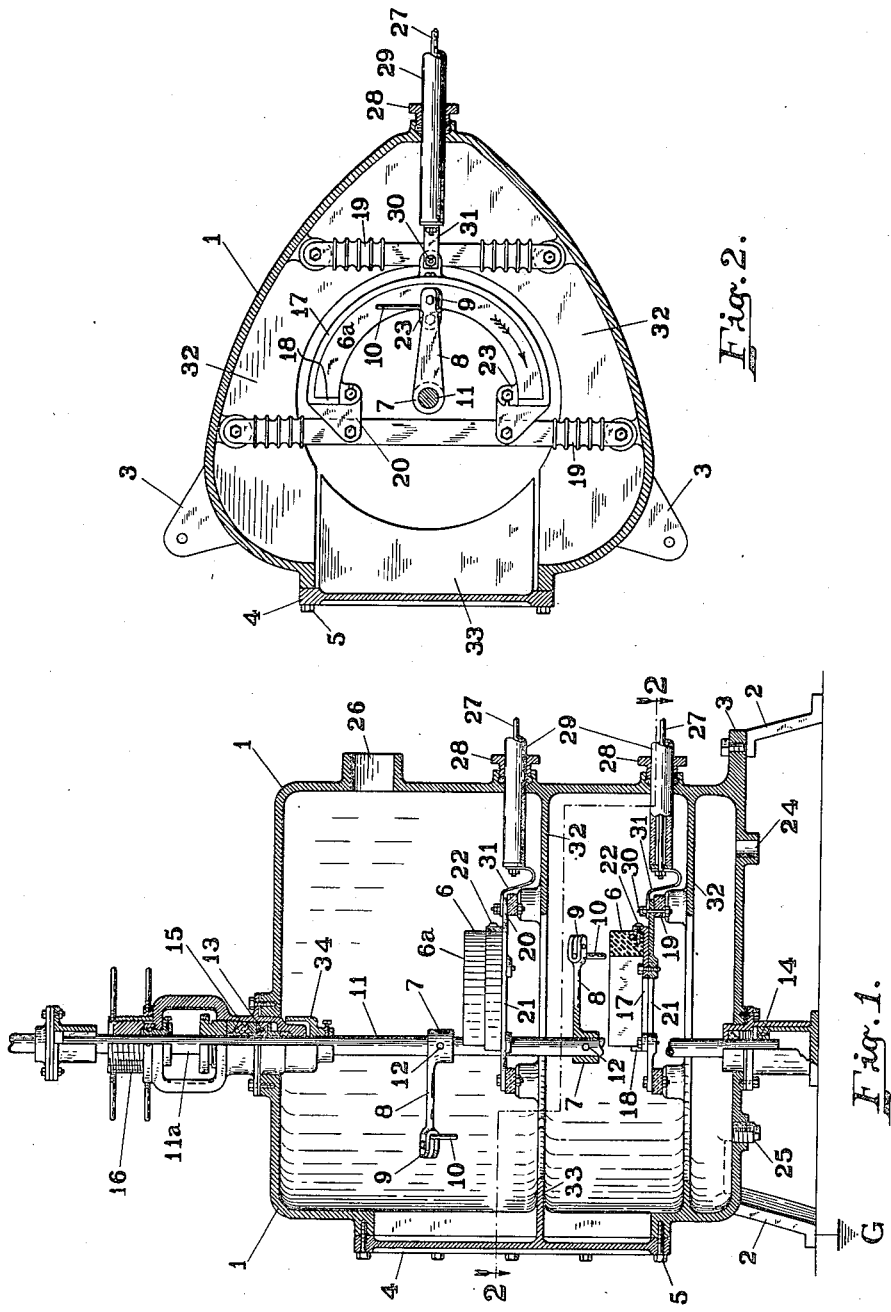

ELECTROTHERMAL PYROLYSIS OF CARBON-BEARING LIQUIDS

Victor F. Hanson, Niagara Falls, N. Y., assignor to E. I. du Pont de Nemours & Company, Wilmington, Del., a corporation of Delaware Application October 6, 1937, Serial No. 167,632

2 Claims. (Cl. 204—31)

This invention relates to the electrothermal pyrolysis of carbon-bearing liquids by means of a submerged electric arc and more particularly to an improved method for effecting such pyrolysis and to an apparatus which is especially well suited for practicing said method.

It has been known that alternating current is better suited than is direct current for carrying out such pyrolysis processes. This is due primarily to the fact that with alternating current a pulsating arc is produced because of the alternate quenching and striking of the arc. Such an arc facilitates the movement of the dissociating liquid into the arcing zone and also the removal of dissociation products from said zone. However, the use of alternating current by methods heretofore advocated is not entirely satisfactory since the alternate quenching and striking of the arc occurs so rapidly that when the next succeeding arc is struck there still remains in the liquid medium of the arcing zone a substantial amount of decomposition products from the previous arc, even though the liquid surrounding the arc is rapidly and vigorously agitated. This is objectionable in that the recurring arc is repeatedly acting to a substantial extent upon the dissociation products, which action appreciably reduces their value. Thus, carbon-black as it is initially formed is finely and uniformly divided and is highly dispersed in the carbon-bearing liquid. In other words, it possesses those physical characteristics desired of carbon-black which is to be used in rubber compositions or for pigment in inks and paints. However, such properties are not retained by the carbon-black if it is again subjected to the action of succeeding arcs, which action tends to agglomerate and otherwise affect the product so as to destroy to a substantial extent its original desirable properties.

An additional disadvantage which is characteristic of the use of alternating current by heretofore known methods is that the maximum electrical efficiency is not obtainable thereby. Electrical energy expended in acting upon dissociation products, such as preformed carbon-black or gaseous products, is largely wasted. Furthermore, these methods do not adequately provide for cooling and wetting of the electrodes between successive arcs. Localized heating is, in part at least, responsible for the deposition of carbon upon the arcing surfaces. It is known, for example, that when arcing takes place between electrode surfaces which are not kept wet by the original liquid medium or liquid dissociation products and which are permitted to reach a high temperature approaching arcing temperatures, there is a tendency for carbon to deposit on the electrodes due to dissociation which occurs when such hot, non-wetted surfaces are contacted with the carbon-bearing liquid or vapor.

It is an object of my invention to provide an improved method and apparatus for the electrothermal pyrolysis of carbon-bearing liquids by means of a submerged electric arc. A further object is the provision of an improved method and apparatus whereby alternating current may be used in forming periodically recurring arcs in a given arcing zone so as to permit substantially complete removal of dissociation products from the arcing zone during the periods when arcing does not occur. A further object is the provision of a method and apparatus whereby more effective cooling and wetting of the arcing surfaces of the electrodes may be realized and the deposition of granular carbon and the growth of carbon trees on the electrodes is greatly inhibited. These and still further objects will be apparent from the ensuing description of my invention.

The preferred method of accomplishing the above objects in accordance with my invention is to form electric arcs periodically within a body of carbon-bearing liquid between one or more pairs of electrodes while moving one of said electrodes in synchronism with the alternating current of the arc so that the electrodes are brought out of arcing relationship at a time when the current potential is at or close to zero and again brought into arcing relationship at the next succeeding time when the current potential is at or close to zero. The arcing surfaces of the electrodes are maintained at a substantially fixed distance apart during the occurrence of the arcing therebetween and preferably two or more pairs of electrodes are employed so that the full capacity of the electrical system may be utilized. I have found that, for example, arcing may be caused to occur alternatively across one and then the other of the two pairs of electrodes so that each pair is subjected to periodic idle periods, insofar as arcing is concerned, during which periods dissociation products from the previous arc are disseminated and the electrodes are permitted to be thoroughly wetted and cooled by the surrounding liquid. This idle period for one pair of electrodes occurs while the other pair is in arcing relationship and upon the occurrence of the next half cycle of current the situation is reversed.

The accompanying drawing illustrates a preferred form of apparatus for practicing my invention. Fig. 1 shows a vertical section of the apparatus while Fig. 2 is a sectional view of the apparatus taken along line 2—2 of Fig. 1.

In the figures, the casing or reaction chamber 1 is provided with supporting legs 2 which are secured to lugs 3 at the bottom of the reaction chamber. Casing 1 is provided with a removable side closure plate 4 which is secured to the casing by cap screws 5. The electrode assembly comprises two fixed, half-ring electrodes 6 and two movable electrodes 10. The latter are secured to rotatable electrode holders 7, each of which has a radial arm 8 which is provided at its outer end with clamp 9 for securing the electrodes. Holders 7 are mounted upon a common vertical shaft 11 and are secured thereto by means of pins 12 so as to rotate with the shaft. Holders 7 are positioned one above the other upon shaft 11 with the radial arm of one holder extending outwardly in a direction 180° from the direction of the radial arm of the other holder. Half-ring electrodes 6 are mounted as shown one above the other so that the arcing surface 6a of one of said electrodes is in arcing relationship with one of the movable electrodes 10 during one-half of one complete rotation of shaft 11, while the arcing surface 6a of the other half-ring electrode is out of arcing relationship with the other electrode 10. During the next one-half of one complete revolution of shaft 11, the electrodes which were previously in arcing relationship are maintained out of such relationship while the electrodes which were previously not in arcing relationship are maintained in such relationship.

Shaft 11 is rotatably mounted within casing 1 by means of upper and lower bearings 13 and 14, respectively. The upper end 11a of said shaft extends through the upper walls of casing 1 and through packing gland 15. Adjustment means 16 is for raising or lowering shaft 11 whereby the distance between opposing electrodes may be adjusted as desired. Rotation of shaft 11 is effected by any suitable means whereby rotation may be synchronized, if desired as is generally preferred, with the alternating current of the arc. Although not shown in the drawing this may be done in a convenient manner by means of a synchronous motor.

The fixed electrodes 6 are mounted in reaction chamber 1 so that their arcing surfaces 6a lie in planes which are parallel with the planes in which the movable electrodes 10 travel upon rotation of shaft 11. The arcuate electrode supporting plates 21 are secured to supporting insulators 19 by bolts extending through lugs 20. The demountable half-rings 17 are provided with end portions 18 and serve as external rims for electrodes 6. Cap screws 22 serve to press the electrodes against end portions 18 and thus to maintain the electrodes in a secure manner in half-rings 17. Inwardly projecting slotted lugs 23 on half-rings 17 are secured by bolts or screws to lugs 20 on the arcuate support 21 and facilitate the removal of electrodes 6 together with half-ring members 17 when desired.

As shown in Figure 2, the rod-shaped electrodes 10, which are of relatively small cross-section, project downwardly toward the opposing arcing surfaces 6a of the fixed electrodes 6 and rearwardly with respect to the direction of rotation (shown by the arrow) at an angle preferably of about 60° to the vertical. The half-ring electrodes 6 are of relatively small width in proportion to their length and provide on their upper surfaces, extended arcing surfaces. Electrodes 6 and 10 may be of any suitable conducting material but are preferably constructed of carbon. Carbon electrodes manufactured in the same general manner as ordinary carbon electrodes commonly employed for maintaining electric arcs are entirely satisfactory for the present purpose.

The carbon-bearing liquid may be admitted into the reaction chamber 1 by means of inlet 24 at the bottom and the products of dissociation removed through outlet 26 located in the upper part of chamber 1. The reaction chamber 1 is provided with a drain 25 so that its liquid contents may be removed completely at any desired time. Leads 27, which provide electrical connection with, for example, a single phase transformer, extend through insulators 29 which are surrounded by packing glands 28. Leads 27 are connected by means of binding posts 30 and flexible connections 31 to the supporting assembly for the fixed electrodes 6. Casing 1 is grounded as shown at G.

The apparatus as shown also includes baffles 32 which project inwardly from casing 1 and baffle 33 which projects inwardly from closure plate 4. These baffles function to direct the liquid and cause it to flow upwardly towards the electrodes from inlet 24. Element 34 is a throw-off ring borne by shaft 11 for inhibiting access of liquid to upper bearing 13.

The apparatus illustrated in the drawing may be operated in the usual manner as relates to the supplying of electrical energy and carbon-bearing liquid thereto. Carbon-bearing liquid and decomposition products may be added to and removed, respectively, from reaction chamber 1 as indicated or in any known manner and the temperature of the carbon-bearing liquid may be controlled as desired. In order that the advantages which are characteristic of my improved process may be realized, the rotation of shaft 11 should be such as to provide an idle period of substantial duration during each cycle of the arc current. The rotation is preferably synchronized with the arc current so that one pair of the opposing electrodes is in arcing relationship while the other pair is out of such relationship. By the use of two pairs of electrodes, one of which effects pyrolysis during one-half cycle while the other effects pyrolysis during the next one-half cycle, it is possible to utilize the full capacity of the electrical system. However, it is not essential to the operation of my process that two pairs of electrodes be employed. Thus, one pair may be used whereby no arcing occurs during one-half of the cycle so that during operation, the apparatus functions as a rectifier. Similarly, the arrangement of electrodes may also be extended, if desired, to three phases on the same shaft. In general, however, I prefer to employ two pairs of electrodes as shown in the accompanying drawing.

Although generally preferable, it is not essential that the movement of the movable electrode be synchronized with the arc current so as to bring the electrodes out of contact at or about the time the current potential is zero. Good results may be obtained in accordance with my invention regardless of whether or not said movement is so synchronized, so long as the movement is effected so as to provide an idle or rest period which corresponds to a substantial part of each cycle of the arc current. It is essential, however, that the moving electrode be caused to travel over the arcing surface of the opposing electrode at a substantially uniform distance therefrom during a substantial part, preferably one-half, of each cycle of the arc current. Thus, when using a half-ring stationary electrode and a moving rod electrode which travels in a generally circular path in a plane parallel with the plane in which lies the arcing surface of the half-ring electrode, the movement of the rod electrode may or may not be synchronized with the arc current. If it is so synchronized, the electrodes will be brought out of arcing relationship with each other at the time the current potential of the arc is at or near zero and arcing will occur only while the arcing surfaces are at a substantially fixed distance apart. If, however, the movement of the rod electrode in its circular path is shifted so as to be, for example, one-fourth of a cycle slower than the cycle of the arc current, a rest period of small duration will occur at the point of travel over the mid-section of the half-ring electrode or when the arc current approaches, passes and moves away from one point of zero potential in its cycle. After passing through this rest period, the arc restrikes as the potential increases and is stretched beyond the end of the half-ring electrode until it reaches its breaking point or until the current potential is again zero. After this second point of zero potential, there occurs a rest period of at least a quarter-cycle duration since the arc cannot restrike until the moving electrode is brought over the arcing surface of the other half of the half-ring electrode. In this method, one comparatively short and another relatively long idle period occurs during each cycle, the relatively long rest period having a duration of at least one-fourth cycle. Although this method may be practiced with good results, I prefer to synchronize the movement with the arc current so as to provide a one-half cycle idle period for each cycle of the arc current.

The use of electrode pairs consisting of one electrode having a restricted arcing area which moves over an extended arcing area of a fixed electrode is known to be productive of improved efficiencies in the preparation of pyrolysis products from carbon-bearing liquids. These advantages are due in general to the fact that when employing such electrodes, the arcing surfaces are maintained at a substantially fixed distance apart during the movement of one electrode over the other so that as arcs are struck they are drawn out to the breaking point whereupon a second arc is immediately formed since the electrodes are maintained at fixed distances apart. This arrangement facilitates the restriking of arcs and thus is superior to the arrangement wherein, for example, a moving rod-shaped electrode strikes an arc as it passes the end of a fixed rod-shaped electrode having a restricted arcing surface. In the latter case, a relatively greater striking potential is required to strike each arc. In the present apparatus, the use of half-ring electrodes in place of fixed electrodes having restricted arcing surfaces combines to as great an extent as possible the advantages of using fixed electrodes having extended arcing surfaces, e. g., full ring electrodes, with the advantages of providing a complete half-cycle of rest for each electrode pair.

Various modifications of the apparatus shown may be employed for practicing my improved method. However, the apparatus shown by the drawing is especially well suited for this purpose and constitutes a preferred embodiment of my apparatus.

My invention is not restricted to operation under specific voltages, frequencies or other related operating conditions since its operation may be practiced under conditions which are generally suitable for methods and apparatus previously employed using alternating current. Thus, the voltage between the opposing electrodes may vary between 2000 to 10,000 volts. Similarly, operation of my apparatus is not restricted to specific current densities. However, it is generally preferable to use high current densities, based upon the arcing area of the electrode having a restricted arcing surface, such as the rod-like electrode shown in the drawing. In general, an arcing current exceeding 100 amperes per square inch and preferably exceeding 300 amperes per square inch should be used. Current corresponding to as high as 600 amperes per square inch may also be used with good results.

It is generally preferable to employ currents of low frequency so that the idle periods for each electrode pair during each cycle will be of sufficient duration to permit substantially complete removal of decomposition products from the arcing zone and facilitate thorough wetting and cooling of the electrodes. Thus, frequencies of 25 to 60 cycles per second are generally preferred, especially since alternating current of these frequencies is most generally available for industrial purposes. However, frequencies as high as 500 cycles may be used with good results.

In practicing my invention, the decomposition products are substantially completely removed from the arcing zone during each cycle of the arc current. As a result, no substantial amount of the electrical energy is wasted by acting upon previously formed decomposition products so that better electrical efficiencies are realizable. In addition, the desirable characteristics of, for example, carbon-black as it is originally formed remains substantially unaltered since the rest period during each cycle permits the removal of the carbon-black as it is formed from the arcing zone in a finely and uniformly divided condition so that it is easily dispersed in the surrounding carbon-bearing liquid. Furthermore, the rest period during each cycle greatly facilitates the cooling and wetting of the electrode surfaces so that the deposition of granular carbon and the growth of carbon trees on the electrodes is greatly inhibited. These and other advantages of my invention will be apparent to those skilled in the art of preparing useful products by the electrothermal pyrolysis of carbon-bearing liquids by means of a submerged electric arc.

In the foregoing and in the appended claims, I use the term "carbon-bearing liquid" to include organic liquids generally and mixtures thereof. The liquid hydro-carbon oils are especially suited for use in my process since they are relatively cheap, but it is to be understood that the process and apparatus described and claimed may be used with good results with liquid organic materials in general.

While I have discussed in the foregoing in some detail my preferred method and apparatus together with some modifications thereof, I wish it understood that this is for the purpose of making the invention more clear and that the invention is not to be regarded as limited to the details of procedure and apparatus described.

On the other hand, my invention is to be regarded as limited only by the scope of the appended claims.

I claim:

1. A process for the pyrolysis of carbon-bearing liquids comprising periodically forming electric arcs between a pair of electrodes within a body of carbon-bearing liquid while synchronizing the movement of one of said pair of electrodes with the alternating arc current so as to bring said pair of electrodes out of arcing relationship at a time when the current potential is at or close to zero during alternate half cycles of said current and provide a rest period of substantial duration of said pair of electrodes during alternate half cycles of said current.

2. A process for the pyrolysis of carbon-bearing liquids comprising periodically forming electric arcs between two pairs of opposing electrodes within a body of carbon-bearing liquid while synchronizing the movement of one electrode of each of said pairs of electrodes with the alternating arc current so as to bring simultaneously one of said pairs of electrodes out of arcing relationship and the other of said pairs of electrodes into arcing relationship at a time when the current potential is at or close to zero and so as to bring simultaneously said first mentioned pair of electrodes into arcing relationship and said other pair of electrodes out of arcing relationship at the next succeeding time when the current potential is at or close to zero.

VICTOR F. HANSON.